United States Patent
Rosswog et al.

(10) Patent No.: US 9,208,398 B2
(45) Date of Patent: Dec. 8, 2015

(54) IMAGE PROCESSING FOR FORMING REALISTIC STRATUM DETRITUS DETAIL IN A CAMOUFLAGE PATTERN AND A CAMOUFLAGE PATTERN FORMED THEREBY

(71) Applicant: NTA Enterprise, Inc., Pittsburgh, PA (US)

(72) Inventors: Michael A Rosswog, Pittsburgh, PA (US); Karen Skolnick, Pittsburgh, PA (US)

(73) Assignee: NTA ENTERPRISE, Inc., Pittsburgh, PA (US)

( * ) Notice: Subject to any disclaimer, the term of this patent is extended or adjusted under 35 U.S.C. 154(b) by 19 days.

(21) Appl. No.: 14/083,785

(22) Filed: Nov. 19, 2013

(65) Prior Publication Data
US 2014/0294297 A1    Oct. 2, 2014

Related U.S. Application Data

(60) Provisional application No. 61/727,879, filed on Nov. 19, 2012.

(51) Int. Cl.
*G06K 9/00* (2006.01)
*G06K 9/46* (2006.01)
*G06T 11/00* (2006.01)

(52) U.S. Cl.
CPC ............... *G06K 9/46* (2013.01); *G06T 11/001* (2013.01); *G06K 9/4652* (2013.01)

(58) Field of Classification Search
CPC ........ G06K 9/46; G06K 9/4652; G06T 11/60; A01M 31/02
USPC ........................................... 382/165
See application file for complete search history.

(56) References Cited

U.S. PATENT DOCUMENTS 6,342,290 B1 *   1/2002   Conk .................... 428/195.1
6,678,425 B1 *   1/2004   Flores et al. ............ 382/289

* cited by examiner

*Primary Examiner* — Ali Bayat
(74) *Attorney, Agent, or Firm* — Blynn L. Shideler; Krisanne Shideler; BLK Law Group

(57) ABSTRACT

An image processing method forming realistic stratum detritus detail in a camouflage pattern comprises the steps of: Identifying the desired camouflage genre; Forming a base image layer with a shallow depth of field which includes a foreground focal element extending substantially across the width of the pattern; Forming a lattice work image layer including a lattice work of appropriate natural elements; Overlaying the lattice work image layer onto the base image layer; and Blending detritus images into the natural elements of the lattice work. Camouflage patterns formed according to the disclosed process are also disclosed which form a more effective hunter camouflage pattern.

18 Claims, 4 Drawing Sheets

IMAGE PROCESSING FOR FORMING REALISTIC STRATUM DETRITUS DETAIL IN A CAMOUFLAGE PATTERN AND A CAMOUFLAGE PATTERN FORMED THEREBY

RELATED APPLICATIONS

This application claims the benefit of provisional patent application Ser. No. 61/727,879 filed Nov. 19, 2012 entitled "Image Processing for Forming Realistic Stratum Detritus Detail in a Camouflage Pattern and a Camouflage Pattern Formed Thereby".

BACKGROUND OF THE INVENTION

1. Field of the Invention

The present invention relates to forming effective camouflage and more specifically to image processing for forming realistic stratum detritus detail in a camouflage pattern and a camouflage pattern formed thereby.

2. Background Information

A quick history of camouflage will often delves through the military applications of camouflage. It has been noted that in feudal Japan, Ninjas in the 14th century used mostly dark camouflage colors during their operations which normally occurred from dusk till dawn. Other times, when the occasion warrants the ninja was known to don suitable cover clothing to blend with the operating environment. In the west, smaller irregular units of scouts or rangers in the 18th century were the first to adopt unit colors in drab shades of brown and green. An example of such a unit would be the famed British 95th Rifle Regiment, which was created during the Napoleonic War to strengthen the British skirmish line. As the British 95th carried more accurate Baker Rifles, and thus engaged at a longer range, they were equipped with a rifle green jacket, in stark contrast to the line regiments scarlet tunics. The British in India in 1857 were forced by casualties to dye their red tunics to neutral tones, initially a muddy tan called khaki which became standard in the British Indian service in the 1880s. The United States was quick to follow the British, going khaki in the same year. Russia followed, partially, in 1908. The Italian army used "grigio-verde" (grey-green) across the army from 1909. The Germans adopted "feldgrau" (field grey) in 1910.

The French also established a Section de Camouflage (Camouflage Department) in 1915 wherein the camouflage experts were, for the most part, painters, sculptors, theatre-set artists and such. Technological constraints meant that patterned camouflage uniforms were not typically mass manufactured during World War 1. Each patterned uniform of the era was hand-painted, and so restricted to snipers, forward artillery observers, and other exposed individuals. More effort was put into concealing larger pieces of equipment and important structures. Units of "Camoufleurs" who were artists, designers, or architects in civilian life were also largely used by the combatants of World War 1. The British Camouflage Section was established in 1916; the U.S. New York Camouflage Society was established in 1917; the U.S. official Company A, 40th Engineers was set up in 1918; and the U.S. Women's Reserve Camouflage Corps was established 1918 and Italy's Laboratorio di mascheramento, was established in 1917. Germany's Lozenge was possibly the earliest printed camouflage in 1917.

The word camouflage is believed to first enter the English language in 1917. Specialist troops, notably snipers, were often supplied with various items of camouflage, including patterned veils for the head and gun, hand-painted overalls and scrim-covered netting or sacking-an adaptation of the rag camouflage used in Scotland by anti-poaching wardens, gillies, the first ghillie suits.

The first mass-produced military camouflage material was the Italian telo mimetico ("mimetic cloth") pattern of 1929, used to cover a shelter-half (telo tenda), an idea copied by the Germans in 1931. With mass-production of patterned fabrics possible, such mass produced camouflage patterned fabrics became far more common on individual soldiers in WW II. Initially, patterning was uncommon; a sign of elite units, to the extent that captured camouflage uniforms would be often "recycled" by an enemy. The Red Army issued "amoeba" disruptive-pattern suits to snipers from 1937 and all-white ZMK top-garments the following year, but it was not until hostilities began that more patterns were used. The Germans had experimented before the war, and some army units used "splinter" pattern camouflage. Waffen-SS combat units experimented with various patterns, including Palmenmuster ("palm pattern"), Sumpfmuster ("swamp pattern"), Erbsenmuster ("pea pattern"), and also telo mimetico ("mimetic cloth") using fabric seized from the Italians in 1943. In the U.S. military, General Macarther, in 1942, demanded 150,000 jungle camouflage uniforms for U.S. troops in the pacific theater and a 1940 design, dubbed "frog-skin", was chosen and issued as a reversible beach/jungle coverall-soon changed to a two-part jacket and trousers. Turning to the present, camouflage uniforms is a part of virtually all modern militaries.

The transfer of camouflage patterns from battle to civilian uses is not exactly a recent phenomenon. For example, military camouflage was used by the French on their trucks and automobiles (the only military vehicles of the day) and within three weeks of the German invasion of France in 1914, the couturiers of Paris, having observed the French truck pattern designs, had turned those abstract patterns into women's' clothing. Fashion has since become increasingly eager to adopt camouflage, with the fashion world attracted by the striking designs, the "patterned disorder" of camouflage, its symbolism, and its versatility. Fashion designers adopting camouflage into fashion include Jean-Charles de Castelbajac (1975-), Roland Chakal (1970), Stephen Sprouse (using Warhol prints, 1987-1988), and Franco Moschino (1986), but it was not until the 1990s that camouflage became a significant and widespread facet of dress from streetwear to high-fashion labels—especially the use of "faux-camouflage". Producers using camouflage in the 1990s and beyond include: John Galliano for Christian Dior, Marc Jacobs for Louis Vitton, Comme des Garcons, Chanel, Tommy Hilfiger, Dolce & Gabbana, Issey Miyake, Armani, Yves Saint-Laurent, and others.

Aside from the fashion world, camouflage clothing was adopted by outdoor enthusiast, namely hunters. Following World War II, many hunters popularized the use of military camouflage for use in hunting, with many using World War II vintage patterns. This trend, in part, helped spur the growth of "military surplus" retail stores. The divergence of modern hunting camouflage from military camouflage is often attributed to Jim Crumley who reportedly believed he could be more effective at hunting by wearing camouflage that melded with the woodland habitat he hunted and recognized that U.S. military camouflage patterns were designed to match areas where the United States might engage in combat and thus did not adequately match the woodland hunting areas he frequented. Jim Crumley developed woodland specific hunting camouflage to better match the woodland hunting areas he frequented under the TREBARK® brand in 1980.

Another innovator for modern hunting camouflage, as opposed to military camouflage, was Bill Jordan who, in the mid 1980's, reportedly believed that overlaying realistic images of a leaf pattern on a vertical bark pattern would produce a three-dimensional effect that would blend well with hardwood trees. Bill Jordan is the founder of the modern REALTREE® brand of hunting camouflage designs which are now created using digital cameras and photo-realistic printing.

The story of modern hunting camouflage, as opposed to military camouflage, is not complete without a mention of Toxey Haas, an avid outdoorsman who gained inspiration from the natural twigs, leaves, and dirt in the woods and decided to find someone who could print a fabric resembling these natural elements. In 1986, Toxey Haas established Haas Outdoors, Inc. selling a line of hunter camouflage fabric patterns under the MOSSY OAK® brand and which in 1995, introduced a new technology in hunter camouflage pattern development consisting of adding shadows to increase the depth of the camouflage.

As digital imagery and printing technology increased, many modern hunter camouflage patterns have become more realistic as they strive to achieve more depth, detail, and definition in the images forming the hunter camouflage pattern.

There remains a need for more effective hunter camouflage patterns. In the hunting world, it has been said that a hunting accessory such as a new camouflage pattern that results in the game taking one more step toward the hunter is a significant substantial improvement.

It is the object of the present invention to provide a more effective hunter camouflage patterns that hopefully results in the game taking one more step toward the hunter and to provide image processing for forming realistic stratum detritus detail in camouflage pattern for developing such effective hunter camouflage patterns.

SUMMARY OF THE INVENTION

Some of the advantages of the present invention are achieved with the provision of a more effective hunter camouflage patterns and the provision of image processing for forming realistic stratum detritus detail in camouflage pattern for developing such effective hunter camouflage patterns. The present invention provides an image processing method forming realistic stratum detritus detail in a camouflage pattern comprises the steps of: Identifying the desired camouflage genre; Forming a base image layer with a shallow depth of field which includes a foreground focal element extending substantially across the width of the pattern; Forming a lattice work image layer including a lattice work of appropriate natural elements; Overlaying the lattice work image layer onto the base image layer; and Blending the detritus images into the natural elements of the lattice work. Camouflage patterns formed according to the disclosed process are also disclosed.

These and other advantages of the present invention will be clarified in the description of the preferred embodiments taken together with the attached drawings in which like reference numerals represent like elements throughout.

BRIEF DESCRIPTION OF THE DRAWINGS

The invention is illustrated by way of example, and not by way of limitation in the figures of the accompanying drawings in which like reference numerals refer to similar elements.

DESCRIPTION OF THE PREFERRED EMBODIMENTS

As described in detail below, image processing according to the invention forms realistic stratum detritus detail in a camouflage pattern 10 allowing for the development of effective hunter camouflage patterns 10. The patterns 10 of the invention are camouflage patterns including realistic stratum detritus detail in the camouflage pattern 10 as opposed to a "disruptive" camouflage patterns that tend not to include discernible images or elements but rather break up or disrupt the perceived outline of the subject (e.g. a ghillie suit).

Figure 1:
FIG. 1 is a schematic image of a representative camouflage pattern formed by the image processing according the present invention.

FIG. 1 is a schematic image of a representative camouflage pattern 10 formed by the image processing according the present invention. The camouflage pattern 10 is formed of realistic photographic images, processed as described below, of natural elements found in the environment associated with the specific pattern 10. For example the pattern 10 shown is a woodland setting or genre and the image elements are those found in the woodland setting such as loose tree leaves, branches, pine needles and cones, tree trunks and the like. Other genres or settings that can be implemented include marshland or wetland environments, chaparral, rain forest, desert, jungle or grasslands, for example.

The genre of the pattern 10 may be further designated as a seasonal pattern, such as a winter woodland pattern that have the individual elements limited to a collection of winter images, or more precisely not including images of elements clearly incongruous with the desired seasonal pattern (e.g., no snow elements in a summer pattern). The pattern 10 may be further designated as associated with a geographic region, for example a spring woodland pattern 10 may be designed distinctly differently for the pacific northwest as compared with the northeast or the southeast of north America.

Commercially, it may be advisable to design and develop a pattern that is effective in as many environments as possible to maximize consumer interest. Thus there can be an interest in selecting image components that blend in to, or are not incongruous to, as many geographic, seasonal and environmental genres as possible.

Figure 2:
FIG. 2 is a schematic image of a representative base image layer formed in the image processing according the present invention.
Figure 3A:
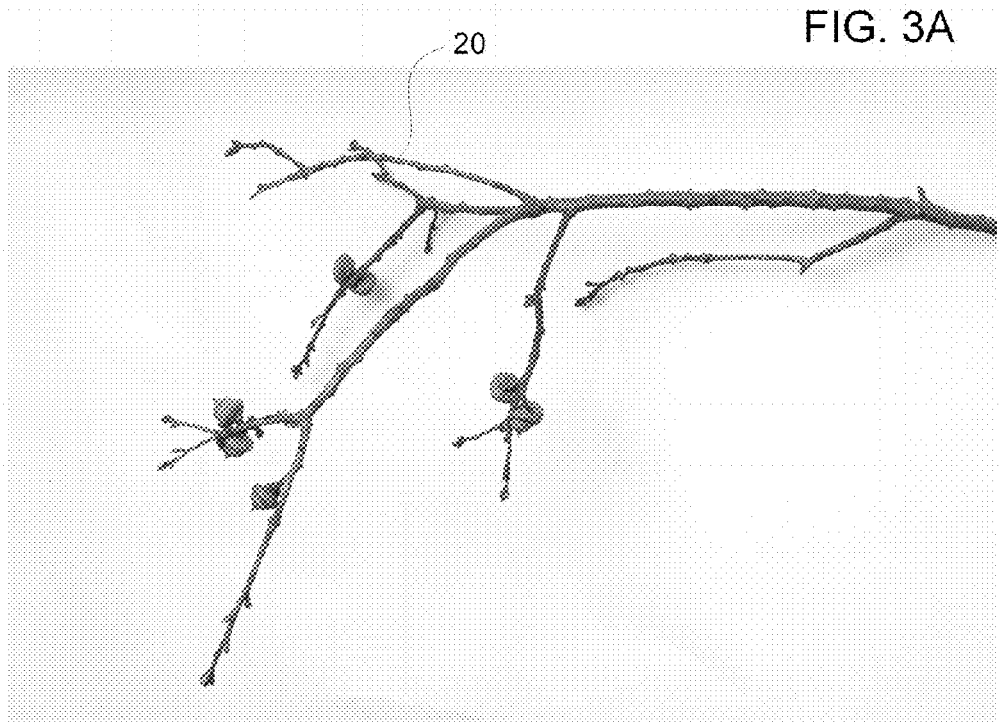
FIGS. 3A-F are schematic images of representative detritus images formed in the image processing according the present invention.
Figure 3B:
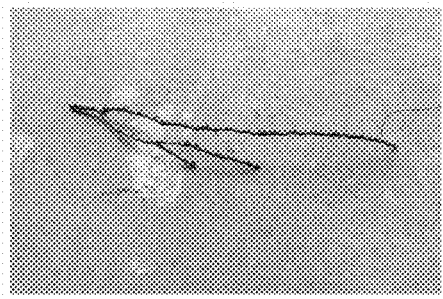
Figure 3D:
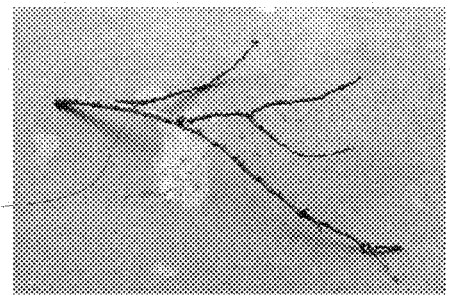
Figure 3C:
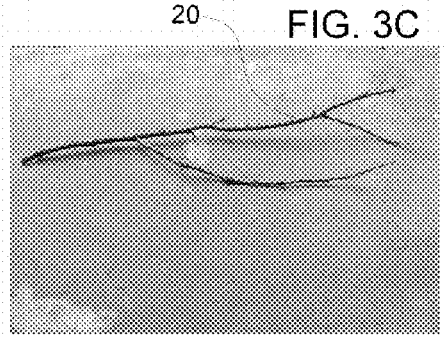
Figure 3E:
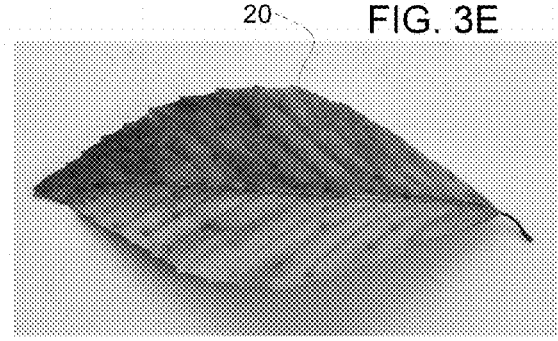
Figure 3F:
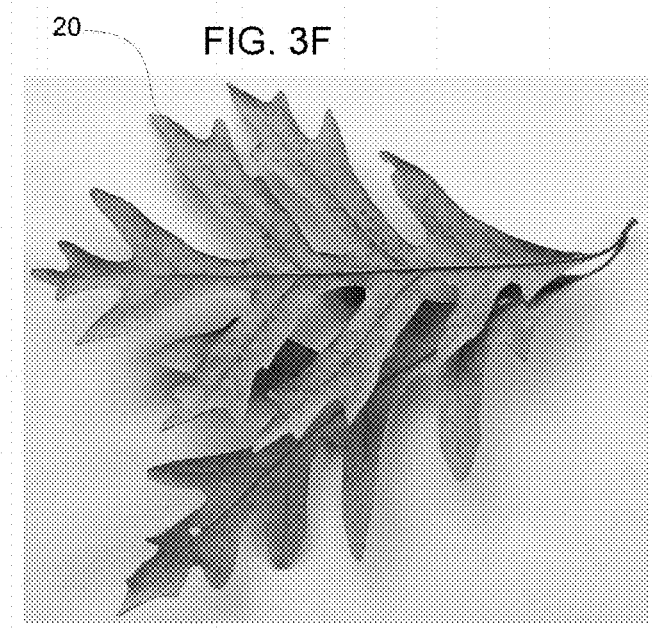

The image processing of the present invention to create any pattern 10 begins with selecting or identifying the desired camouflage genre. Once the genre of the pattern 10 is identified, with as much specificity as desired by the user, a base image layer 12, a representative example of which is shown in FIG. 2, is formed in the image processing according the present invention. The base image layer 12 should include many of the aspects or features of the desired camouflage genre that was not too crowded that would have the natural depth of field. The phrase of "too crowded" is defined herein as an image in which the individual image components will blend together to the average observer at a nominal distance of about twenty feet.

Additionally important features of the base image layer 12 is to include a foreground focal element 14 extending substantially across the width of the pattern 10, meaning foreground focal element 14 extends at least seventy five percent (75%) of the width of the image and preferably extends at least fifty percent (50%) of the height of the pattern. For manufacturing purposes the pattern 10 may be a 60" wide by 30" high image that is typically implemented on fabric and will repeats "top to bottom" in production on the camouflage fabric, but extends the full width of the fabric. The pattern 10 is, of course, not limited to fabric in implementation, but that is the most common implementation by far. The base image layer 12 extends the entire width of the pattern 10 such as a 60" width to extend across the entire width of a fabric layer implementing the pattern 10.

The base image layer 12 preferably has a shallow depth of field, also called shallow focus. In image processing, depth of field (DOF) is the distance between the nearest and farthest objects in a scene that appear acceptably sharp in an image. Although a lens can precisely focus at only one distance at a time, the decrease in sharpness is gradual on each side of the focused distance, so that within the DOF, the unsharpness is imperceptible under normal viewing conditions. The small depth of field of the base image layer 12 emphasizes the subject foreground focal element 14 while de-emphasizing the background. The phrase shallow depth of field is known in the photographic field and most commonly achieved through use of a larger aperture size (e.g., an F-stop of about 4 or below for many applications, with many conventional cameras having F2.8, F2.0 and F1.4 readily available for shallow depth of field). The focal length of the lens, and the total image size also have a relation to the depth of field. A shallow depth of field is commonly utilized in portraiture photography where the portrait subject is naturally to be emphasized in the foreground of the image and the background thereof deemphasized.

The background elements 16, namely generally vertical tree trunks forming the substantive elements 16, are preferably at a considerable distance from the foreground focal element 14 such as over one hundred feet (100') away. The base image layer 12 example shown was taken with the foreground focal element 14 a few feet from the camera and background overlooking a valley placing the elements 16 at a distance. The camera aperture was selected to be relatively large (generally less than F/4.0). The elements 16 are spaced sufficiently apart to avoid image crowding to prevent the elements 16 in the resulting base image 12 from blurring together to the average observer at a reasonable distance of about twenty feet.

The next step in the image processing of the present invention is to identify and photograph images of the detritus elements 20 that are generally visually interesting and/or meaningful or symbolic to the genre of the pattern 10. For example for a woodland pattern white oak leaves are often found near deer so those in the pattern make sense for hunting pattern. The detritus elements 20 are selected to be cohesive with the genre of the pattern 10 and the base image layer 10. The images are generally high resolution, high sharpness images of the specific elements 20. FIGS. 3A-F show representative detritus images for elements 20 formed in the image processing according the present invention. There is no minimum or maximum number of elements 20 in pattern 10, other than there should be sufficient number of elements 20 to break up the pattern 10 and add realism to the pattern 10, however a typical number for a pattern 10 is 5 to 20 unique elements 20.

Figure 4:
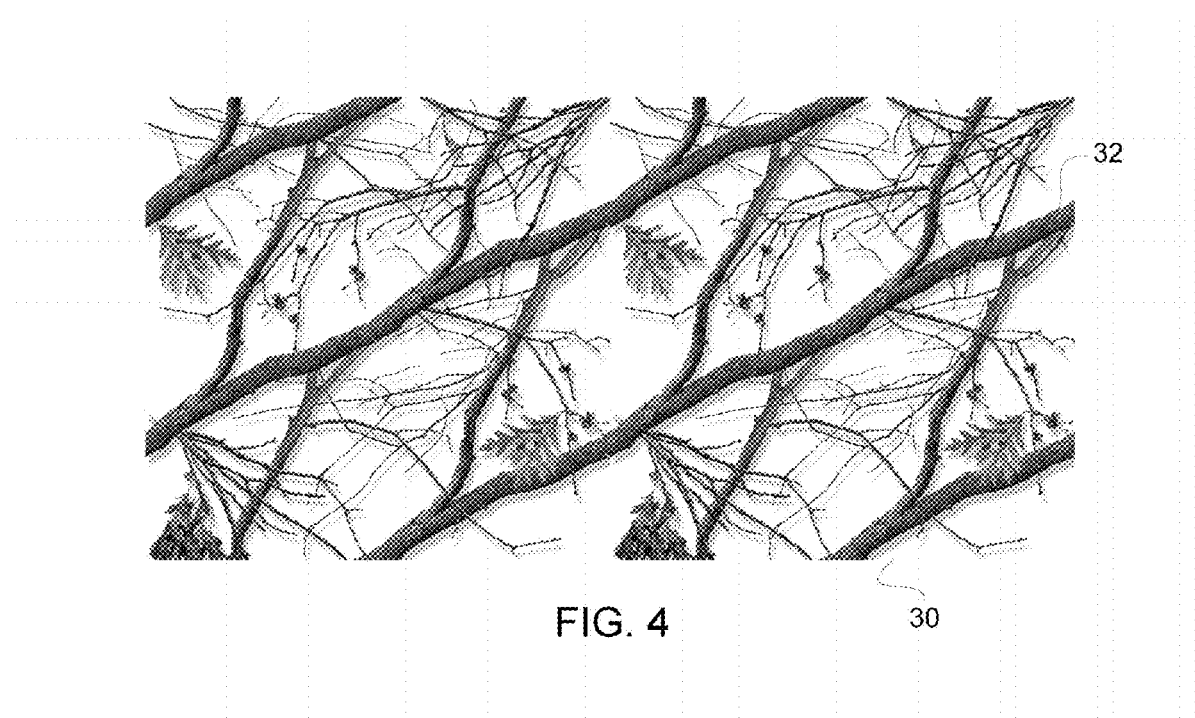
FIG. 4 is a schematic image of a representative lattice work image layer formed by the image processing according the present invention.

The next step in the image processing of the present invention is to identify and photograph elements that can be used to tie the individual elements together. FIG. 4 is a schematic image of a representative lattice work image layer 30 formed as a lattice work of appropriate natural elements 32 such as larger branches with unique and visually appealing growth patterns that can be repeating up and down the pattern 10. The height repeating pattern 10 requires that the position of the elements 32 at the top of the image of pattern 10 will generally match the diameter and color and other aspects of an aligned element 32 at the bottom of the pattern 10, thereby providing a substantially continuous pattern 10 along a length of fabric.

Preferably the lattice work image layer 30 is formed of all substantially angular components or elements 32 extending at about 15, 30 or 45 degrees. The elements 32 may be blended together, e.g. a series of branches digitally blended together to form the lattice work image layer 30. Horizontal and vertical orientations could be used, but angular lattice work appears to a more random natural appearance in the final pattern 10. In other words, it is believed that in many patterns 10 too much horizontal and vertical detail, particularly in lattice work layer 30, tends to result in an unnatural appearance in the final pattern 10.

The lattice work image layer 30 is open large and spaced out to be able to peer through it. The term "Open" in this context suggests that with a 60" by 30" pattern 10 the lattice work layer 30 includes open generally 6"×6" areas.

The lattice work image layer 30 is overlaid onto the base image layer 12 and the detritus images 20 are selectively digitally blended in individually. The digital blending of each image 20 can include the steps of making part of the image be "behind" or "in front of" (or both) a lattice work element 32 and to adjust the focus, sharpness, shading to match that of the adjacent element 32. Some detritus images 20 may also be blended with the foreground focus element 14 or even the background elements 16, as desired. Overall the blended detritus images 20 have a sharpness and color and focus that break-up the pattern 10 and give an overall unique look and feel to the pattern 10. The detritus images 20 add "punch" to the design.

In some respects the image processing of the present invention is a specialized form of "focus stacking" which combines multiple images taken at different focus distances to give a resulting image with a greater depth of field than any of the individual source images.

Available programs for multi-shot DOF enhancement such as in the process of the present invention include Adobe PHOTOSHOP®, Syncroscopy AUTOMONTAGE®, Photo-Acute STUDIO®, Helicon FOCUS® and COMBINEZ®. Any of these are acceptable programs for forming the pattern 10 of the present invention.

It will be apparent to those of ordinary skill in the art that various modifications may be made to the present invention without departing from the spirit and scope thereof. The scope of the invention is not to be limited by the illustrative examples described above.

What is claimed is:

1. An image processing method forming realistic stratum detritus detail in a camouflage pattern comprising the steps of:

Identifying the desired camouflage genre;

Forming a base image layer with a shallow depth of field which includes a foreground focal element extending substantially across the width of the pattern;

Forming a lattice work image layer including a lattice work of appropriate natural elements;

Overlaying the lattice work image layer onto the base image layer, wherein the lattice work image layer elements are repeating up and down the pattern, whereby the position of the elements at the top of the image of pattern will generally match the diameter and color and other aspects of an aligned element at the bottom of the pattern, thereby providing a substantially continuous pattern; and Blending detritus images into the natural elements of the lattice work.

2. The image processing method forming realistic stratum detritus detail in a camouflage pattern according to claim 1 wherein the foreground focal element extends at least seventy five percent (75%) of the width of the image and extends at least fifty percent (50%) of the height of the pattern.

3. The image processing method forming realistic stratum detritus detail in a camouflage pattern according to claim 2 wherein the base image layer includes background elements at a distance from the foreground focal element of over one hundred feet (100') away.

4. The image processing method forming realistic stratum detritus detail in a camouflage pattern according to claim 3 wherein the background elements are spaced sufficiently apart to avoid image crowding, whereby the elements do not blur together to the average observer at a distance of about twenty feet.

5. The image processing method forming realistic stratum detritus detail in a camouflage pattern according to claim 1 wherein the pattern includes 5 to 20 unique detritus images.

6. The image processing method forming realistic stratum detritus detail in a camouflage pattern according to claim 1.

7. The image processing method forming realistic stratum detritus detail in a camouflage pattern according to claim 1 wherein the natural elements of the lattice work layer image are substantially angular components extending between about 15 to 45 degrees.

8. The image processing method forming realistic stratum detritus detail in a camouflage pattern according to claim 1 wherein the lattice work image layer includes open generally 6"×6" areas.

9. A camouflage pattern formed by an image processing method forming realistic stratum detritus detail in a camouflage pattern comprising the steps of: Identifying the desired camouflage genre; Forming a base image layer with a shallow depth of field which includes a foreground focal element extending substantially across the width of the pattern; Forming a lattice work image layer including a lattice work of appropriate natural elements, wherein the natural elements of the lattice work layer image are substantially angular components extending between about 15 to 45 degrees; Overlaying the lattice work image layer onto the base image layer; and Blending detritus images into the natural elements of the lattice work.

10. The camouflage pattern according to claim 9, wherein the foreground focal element extends at least seventy five percent (75%) of the width of the image and extends at least fifty percent (50%) of the height of the pattern.

11. The camouflage pattern according to claim 10, wherein the base image layer includes background elements at a distance from the foreground focal element of over one hundred feet (100') away.

12. The camouflage pattern according to claim 11, wherein the background elements are spaced sufficiently apart to avoid image crowding, whereby the elements do not blur together to the average observer at a distance of about twenty feet.

13. The camouflage pattern according to claim 9, wherein the pattern includes 5 to 20 unique detritus images.

14. The camouflage pattern according to claim 9, wherein the lattice work image layer elements are repeating up and down the pattern, whereby the position of the elements at the top of the image of pattern will generally match the diameter and color and other aspects of an aligned element at the bottom of the pattern, thereby providing a substantially continuous pattern.

15. The camouflage pattern according to claim 9, wherein the lattice work image layer includes open generally 6"×6" areas.

16. A camouflage pattern including realistic stratum detritus detail, said pattern comprising:
a base image layer with a shallow depth of field which includes a foreground focal element extending substantially across the width of the pattern;
a lattice work image layer including a lattice work of appropriate natural elements, wherein the lattice work image layer is overlaid onto the base image layer; and
detritus images blended into the natural elements of the lattice work, wherein the foreground focal element extends at least seventy five percent (75%) of the width of the image and extends at least fifty percent (50%) of the height of the pattern.

17. The camouflage pattern including realistic stratum detritus detail according to claim 16 wherein the base image layer includes background elements at a distance from the foreground focal element of over one hundred feet (100') away.

18. The camouflage pattern including realistic stratum detritus detail according to claim 17, wherein the background elements are spaced sufficiently apart to avoid image crowding, whereby the elements do not blur together to the average observer at a distance of about twenty feet.

* * * * *